US011796474B2

(12) United States Patent
Kim et al.

(10) Patent No.: US 11,796,474 B2
(45) Date of Patent: Oct. 24, 2023

(54) TEST SAMPLE RECEIVING BLOCK AND MICROBIAL DETECTION APPARATUS USING THE SAME

(71) Applicant: THE WAVE TALK, INC., Daejeon (KR)

(72) Inventors: Young Dug Kim, Gyeonggi-do (KR); Kyoung Man Cho, Seoul (KR)

(73) Assignee: THE WAVE TALK, INC., Daejeon (KR)

( * ) Notice: Subject to any disclaimer, the term of this patent is extended or adjusted under 35 U.S.C. 154(b) by 142 days.

(21) Appl. No.: 17/184,736

(22) Filed: Feb. 25, 2021

(65) Prior Publication Data

US 2021/0270741 A1    Sep. 2, 2021

(30) Foreign Application Priority Data

Mar. 2, 2020  (KR) .................. 10-2020-0025968

(51) Int. Cl.
*G01N 21/64* (2006.01)
*G01N 21/27* (2006.01)
(Continued)

(52) U.S. Cl.
CPC ..... *G01N 21/6486* (2013.01); *G01N 15/1012* (2013.01); *G01N 15/1459* (2013.01);
(Continued)

(58) Field of Classification Search
CPC ........... G01N 21/6486; G01N 15/1012; G01N 15/1459; G01N 21/278; G01N 2015/0065;
(Continued)

(56) References Cited

U.S. PATENT DOCUMENTS

2007/0098028 A1* 5/2007 Alcock ............... H01S 5/40
372/50.122
2010/0110424 A1* 5/2010 Wang .................. G01N 21/648
264/293

(Continued)

FOREIGN PATENT DOCUMENTS

| KR | 1020000064148 | 11/2000 |
| KR | 1020160020766 | 2/2016 |
| KR | 1020200004128 | 1/2020 |

*Primary Examiner* — David P Porta
*Assistant Examiner* — Mamadou Faye
(74) *Attorney, Agent, or Firm* — Kaplan Breyer Schwarz, LLP (57) ABSTRACT

The present invention relates to a test sample receiving block and a microbial detection apparatus using the same. The test sample receiving block may include a sample receiving block having a sample groove portion formed therein, the sample groove portion containing the sample so that a light emission module emits light to the sample and a sensor module can detect a speckle generated when the emitted light is scattered by motion of bacteria or microbes contained in the sample, wherein the sample receiving block is surface-treated to increase an optical path of light reaching the sensor module when the emitted light is reflected or scattered by the sample accommodated in the sample groove portion, so that a pattern is formed on a surface of the sample groove portion.

5 Claims, 11 Drawing Sheets

(51) Int. Cl.
  *G01N 15/10* (2006.01)
  *G01N 15/14* (2006.01)
  *G01N 15/00* (2006.01)

(52) U.S. Cl.
  CPC ... *G01N 21/278* (2013.01); *G01N 2015/0065* (2013.01); *G01N 2015/1018* (2013.01)

(58) Field of Classification Search
  CPC ... G01N 2015/1018; G01N 2015/0693; G01N 2015/0687; G01N 15/06; G01N 21/0303; G01N 21/51; G01N 2021/479; G01N 2021/513; G01N 21/4788; G01N 21/49; G01N 15/0205; G01N 15/14; G01N 33/4833; G01N 2015/1006; C12M 45/22
  See application file for complete search history.

(56) References Cited

U.S. PATENT DOCUMENTS

| | | | |
|---|---|---|---|
| 2011/0128537 A1* | 6/2011 | Bond | B82Y 20/00 356/301 |
| 2019/0107487 A1* | 4/2019 | Rahmlow | G01N 21/53 |
| 2020/0081000 A1* | 3/2020 | Williams | B01L 7/52 |
| 2020/0124868 A1* | 4/2020 | Carrascal De Las Heras | G16H 80/00 |

* cited by examiner

TEST SAMPLE RECEIVING BLOCK AND MICROBIAL DETECTION APPARATUS USING THE SAME

CROSS-REFERENCE TO RELATED APPLICATION(S)

This application claims the benefit under 35 USC § 119(a) of Korean Patent Application No. 10-2020-0025968, filed on Mar. 2, 2020, in the Korean Intellectual Property Office, the entire disclosure of which is incorporated herein by reference for all purposes.

BACKGROUND

1. Field

The following description relates to a test sample receiving block and a microbial detection apparatus using the same, and more particularly, to a test sample receiving block and a microbial detection apparatus using the same which can sense motion of bacteria or microbes contained in an object by use of laser speckles.

2. Description of Related Art

Microbes or fine lives affecting health states of the human beings are not visible to human eyes, but exist around human beings and trigger various illnesses. In order to measure such microbes, a microbe cultivation method, a mass spectrometry method, an unclear magnetic resonance method, and the like are generally used as methods of measuring bacteria or microbes. In the case of the microbe cultivation method, the mass spectrometry method, and the unclear magnetic resonance method, specific types of microbes can be precisely measured, but it takes a long time to prepare samples, and expensive, precise, and complicated equipment is necessary.

In addition, there are methods of measuring bacteria or microbes using optical techniques, such as Raman spectrometry or multispectral imaging. However, such methods have drawbacks in that complex optical systems are necessary and specialized knowledge and laboratory-level facilities for operating the complex optical systems and a long period of time for measurement are required.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Measurement of bacteria or microbes using the conventional optical techniques requires complex optical systems and specialized knowledge and laboratory-level facilities for operating these complex optical systems, and also requires a long time for measurement.

Exemplary embodiments of the present invention provide a test sample receiving block and a microbial detection apparatus using the same which can test susceptibility of bacteria, or microbes to antibiotics by quickly sensing motion of the bacteria or microbes contained in an object by use of changes in laser speckle.

According to an embodiment of the present invention, a test sample receiving block is provided. The test sample receiving block may include a sample receiving block having a sample groove portion formed therein, the sample groove portion containing the sample so that a light emission module emits light to the sample and a sensor module can detect a speckle generated when the emitted light is scattered by motion of bacteria or microbes contained in the sample, wherein the sample receiving block is surface-treated to increase an optical path of light reaching the sensor module when the emitted light is reflected or scattered by the sample accommodated in the sample groove portion, so that a pattern is formed on a surface of the sample groove portion.

According to an embodiment of the present invention, the sample receiving block may be at least partially made of aluminum and the pattern may be formed on the surface of the sample groove portion through at least one of anodizing, plating, or deposition.

According to an embodiment of the present invention, the surface of the sample groove portion may be treated to be glossy.

According to an embodiment of the present invention, the sample receiving block may include an emission device receiving portion which is formed on one side of the sample receiving block and communicates with the sample groove portion to accommodate at least a portion of the light emission module; and an image detecting portion which is formed on the other side of the sample receiving block and communicates with the sample groove portion so that an image scattered by the sample is detected by the sensor module.

According to an embodiment of the present invention, a microbial detection apparatus is is provided. The microbial detection apparatus may include a body; a sample receiving module formed in the body and comprising a sample receiving block that accommodates a sample; a light emission module configured to emit light to the sample; a sensor module configured to detect a speckle generated when the light emitted to the sample is scattered by motion of bacteria or microbes contained in the sample; and a controller configured to control the light emitted by the light emission module and store and analyze images detected by the sensor module, wherein the sample receiving block is surface-treated to remove unevenness of a surface of the sample groove portion and form a pattern on the surface of the sample groove portion so that the light scattered by the sample accommodated in the sample groove portion is uniformly reflected on the surface of the sample groove portion.

According to an embodiment of the present invention, the light emission module may include a light source portion configured to generate the light; a light transmission medium configured to transmit the light generated by the light source portion; and a light exit portion configured to emit the light transmitted from the light transmission medium to the sample.

According to an embodiment of the present invention, the light source may include a laser that can emit light of a constant wavelength and the light transmission medium may be an optical fiber.

According to an embodiment of the present invention, the sample groove portion formed in the sample receiving module may be provided in plural and the light emission module may further include a light source splitting device configured to split the light generated by the monolithically formed light source portion into the light exit portion provided in plural.

According to an embodiment of the present invention, the sample receiving module may further include a ball plunger which is formed to be inserted into the sample receiving block so that it presses at least a portion of the container to allow the container to be fixed to the sample is receiving block when the container is inserted into the sample receiving block.

According to an embodiment of the present invention, the microbial detection apparatus may further include a case provided with a cover that can open and close to cover the sample receiving module so that the sample is not exposed to an external environment when a test is performed by coupling a container that contains the sample to the sample receiving module.

According to an embodiment of the present invention, the sample groove portion may accommodate a container in which the sample is contained, and the container may be formed overall in the shape of a column having an opening formed on an upper side and a bottom surface formed on a lower side, wherein a light-incident portion that corresponds to the light emission module and a light exit portion that corresponds to the sensor module are formed such that they are not aligned with each other, so that the speckle generated by the light emission module and detected by the sensor module can be amplified.

According to an embodiment of the present invention, the controller may obtain a temporal correlation of the speckle by using the detected speckle and estimate, in real-time, presence or absence of virus in the sample or a concentration of the virus on the basis of the temporal correlation.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, various exemplary embodiments of the present invention will be described in detail with reference to the accompanying drawings.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

Hereinafter, the embodiments of the present invention will be described with reference to the drawings which schematically illustrate the embodiments. In the drawings, for example, depending on a manufacturing technology and/or tolerance, modifications of illustrated shapes may be expected. Accordingly, it should be understood that the embodiments of the present disclosure are not limited to particular shapes in areas shown in the specification and may include, for example, changes in shape caused during a manufacturing process.

Figure 1:
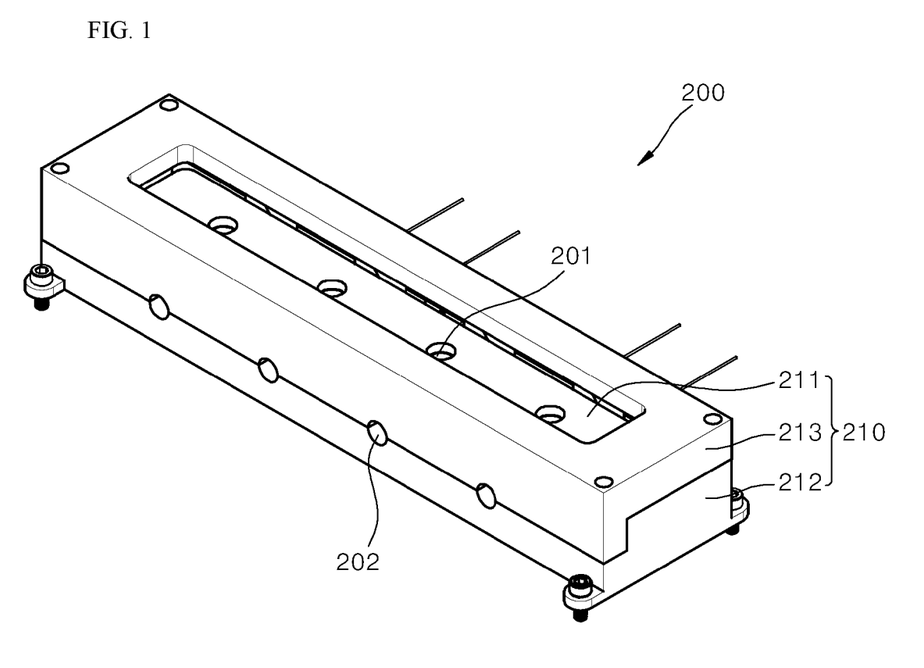
FIG. 1 is a perspective view of a test sample receiving block according to an embodiment of the present invention.
Figure 2:
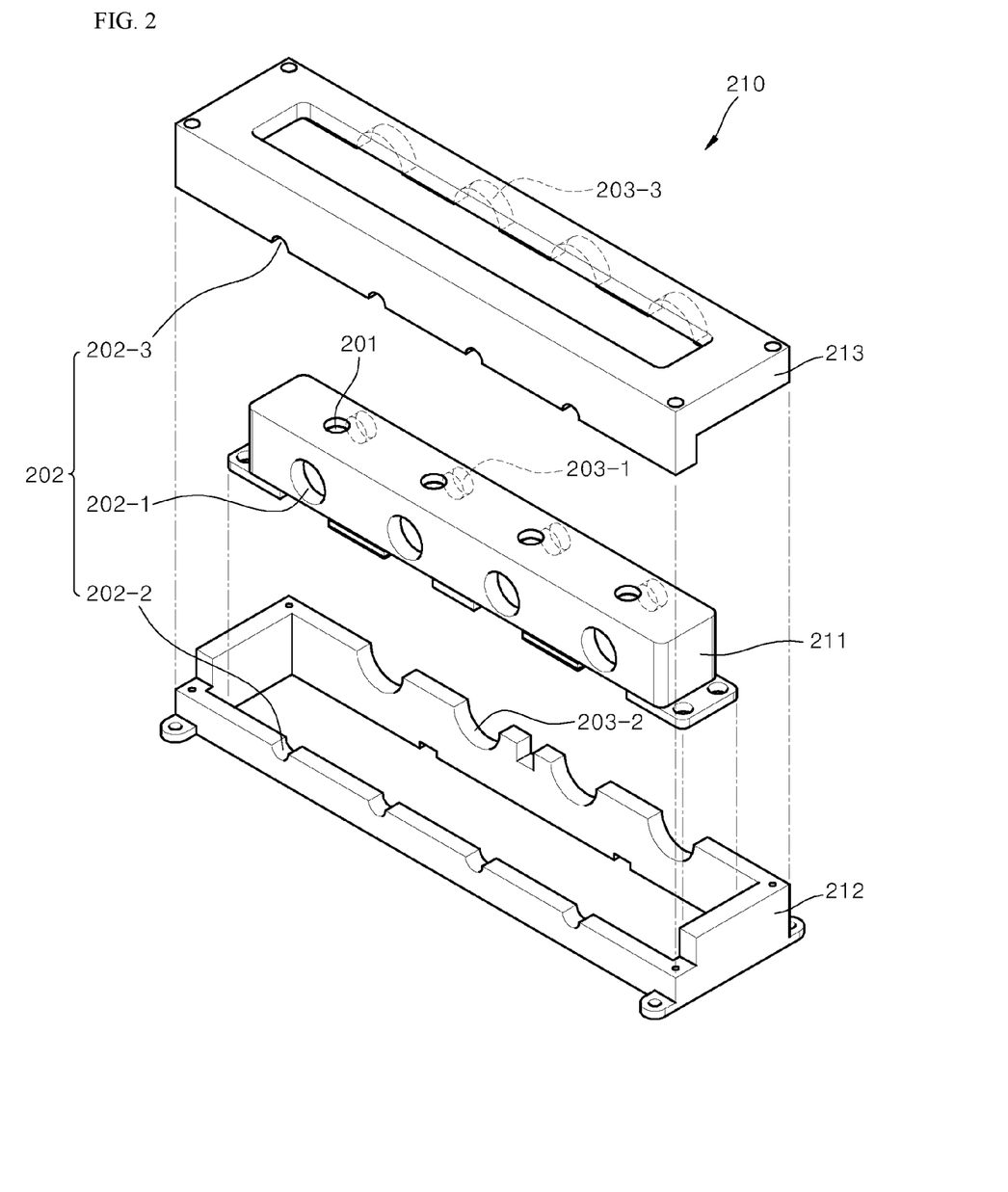
FIG. 2 is an exploded perspective view of the test sample receiving block of FIG. 1.
Figure 3:
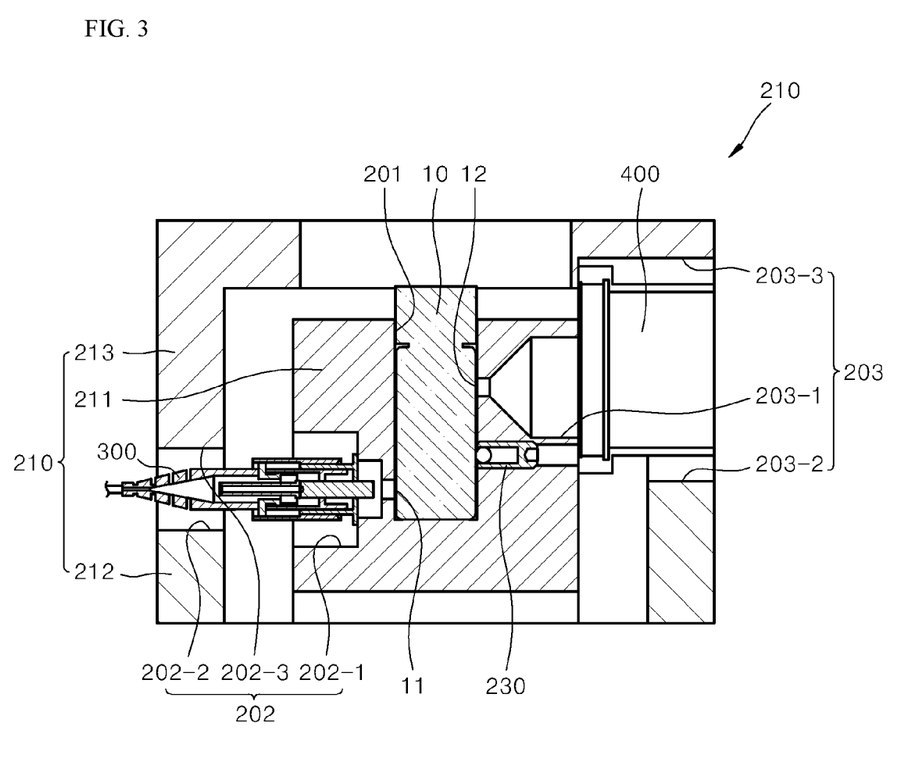
FIG. 3 is a cross-sectional view showing a cross section of a test sample receiving block according to an embodiment of the present invention.

FIG. 1 is a perspective view of a test sample receiving block according to an embodiment of the present invention, FIG. 2 is an exploded perspective view of the test sample receiving block of FIG. 1, and FIG. 3 is a cross-sectional view showing a cross section of a test sample receiving block 210 according to an embodiment of the present invention.

First, the test sample receiving block according to the present invention may include a sample receiving block 210 having a sample groove portion 201 that accommodates a sample therein so that a light emission module 300 emits light to the sample and a sensor module 400 can detect a speckle generated when the emitted light is scattered by the motion of bacteria or microbes contained in the sample.

The sample receiving block 210 may be surface-treated to remove unevenness of a surface of the sample groove portion 201 so that the light scattered by the sample accommodated in the is sample groove portion 201 can be uniformly reflected on the surface of the sample groove portion 201, and thereby pattern may be formed on the surface of the sample groove portion 201.

Unevenness such as scratches or tool paths generated during metal processing in the course of manufacture of the sample receiving block 201 may be removed by adding an arbitrary pattern to the sample groove portion 201, which may minimize deviation between the sample groove portions 201 and facilitate uniform formation of speckles in each sample groove portion.

In this case, the sample receiving block 210 may be formed by anodizing the surface of the sample groove portion 201. More specifically, after immersing the block body 211 in a liquid electrolyte, the block body 211 is connected to an anode and current is applied thereto, whereby an oxide film is formed on the surface of the block body 211 by oxygen generated by the anode when electrolysis is carried out in a dilute acid solution. Accordingly, a semi-ordered pattern may be formed on the block body 211.

As described above, the oxide film is formed on the surface of the sample groove portion 201 by performing surface treatment on the block body 211, so that the unevenness such as scratches or tool paths caused by processing can be removed and the semi-ordered pattern can be formed. Thus, speckles in each sample groove portion 201 may be uniformly formed.

Although not shown, the sample receiving block 210 may be surface-treated by a method such as soft anodization, hard anodization, electrolytic polishing, plasma electrolytic oxidation (PEO), or the like, and the surface of the sample groove portion 201 may be treated to be glossy, thereby minimizing the amount of loss of light reflected on the surface of the sample groove portion and increasing the amount of light.

The sample receiving block 210 may be at least partially made of aluminum. That is, the block body 211 of the sample receiving block 210 may be formed of aluminum having excellent thermal conductivity and relatively high light reflectivity. Aluminum may easily transfer heat for incubating bacteria or microbes and may be optically useful in that it reflects emitted light.

As shown in FIGS. 2 to 3, the sample receiving block 210, in which the sample groove portion 201 that can accommodate a container 10 containing the sample is formed, may include the block body 211, a first block 212, a second block 213, the sample groove portion 201, an emission device receiving portion 202, and an image detecting portion 203.

The block body 211 may be overall formed of aluminum, and a pattern may be formed on the surface of the sample groove portion 201 through at least one of anodizing, plating, or deposition.

That is, in the sample receiving block 210, the block body 211 in which the sample groove 201 is formed is made of aluminum, and the surface of the block body 211 is anodized, so that the surface of the sample groove portion 201 that is formed in a groove shape on an upper portion of the block body 211 may be anodized.

The block body 211 may be formed in a hexahedral shape made of an aluminum material, in which the sample groove portion 201 capable of accommodating the container 10 that contains the sample may be formed on the upper portion, a groove into which at least a portion of the light emission module 300 is inserted may be formed one lateral side, and a groove capable of accommodating at least a portion of the sensor module 400 or a condensing lens may be formed on the other lateral side to allow the sensor module 400 to receive scattered light.

In this case, the sample groove portion 201 may be formed in a groove shape that can accommodate the sample, so that a space in which the sample can be received is formed. In addition, it is preferable that the container 10 accommodates the sample and the container 10 accommodating the sample is inserted into the sample groove portion 201.

The sample may include a sample such as saliva, blood, or tissue, or an organic sample such as food.

The first block 212 may surround at least a portion of the block body 211, and may be in contact with and support lower surfaces of at least portions of the light emission module 300 and the sensor module 400.

For example, a seating portion may be formed on an upper portion of the first block 212 so that the block body 211 is seated thereon, or both the block body 211 and the first block 212 may be seated on the upper portion of the body 100 and each may be coupled to the body 100. Also, a support portion or a groove portion may be formed so that at least another portion of the light emission module 300 can be supported on one side of the first block 212, and another support portion or groove portion may be formed so that at least another portion of the sensor module 400 can be supported on the other side of the first block 212.

The second block 213 may surround at least another portion of the block body 211, may be in contact with upper surfaces of at least another portions of the light emission module 300 and the sensor module 400, and be coupled to the first block 212 to fix the light emission module 300 and the sensor module 400.

For example, the second block 213 may be coupled to the upper portion of the first block 212 and be formed in a shape that surrounds the block body 211 as a whole. Also, the second block 213 may be coupled to the first block 212 and may press upper and lower portions of the light emission module 300 and the sensor module 400 supported by the first block 212, thereby fixing them.

The emission device receiving portion 202 may be formed on one side of the sample receiving block 210 and communicate with the sample groove portion 201 to accommodate at least a portion of the light emission module 300.

For example, the emission device receiving portion 202 has a shape by which at least a portion of the light emission module 300 is inserted into one side of the block body 211 and at least another portion that is not inserted is surrounded by the first block 212 and the second block 213 so that, as a whole, a portion of the light emission module 300 is inserted into one side of the sample receiving block 210.

Specifically, the emission device receiving portion 202 may include a first emission device groove portion 202-1, a second emission device groove portion 202-2, and a third emission device groove portion 202-3.

The first emission device groove 202-1 may be formed in a groove shape on one side of the block body 211 so that an end of the light emission module 300 can be inserted thereinto, the second emission device groove 202-2 may be formed on one side of the first block 212 to surround a lower side of a portion of the light emission module 200, and the third emission device groove portion 202-3 may be formed on one side of the second block 213 corresponding to the second emission device groove portion 202-2 and may surround an upper side of a portion of the light emission module 300.

That is, when the first block 212 and the second block 213 are coupled, the second emission device groove portion 202-2 and the third emission device groove portion 202-3, which are respectively formed on one sides of the first block 212 and the second block 213, are coupled to face each other and form an emission device through-hole, and the end of the light emission module 300 may be inserted into the first emission device groove portion 202-1, passing through the emission device through-hole.

The image detecting portion 203 may be formed on the other side of the sample receiving block 210 and may communicate with the sample groove portion 201 so that the image scattered by the sample may be detected by the sensor module 400.

For example, the image detecting portion 203 may be coupled in a shape by which at least a portion of the sensor module 400 is inserted into the other side of the block body 211 and at least another portion of the sensor module 400 that is not inserted is surrounded by the first block 212 and the second block 213 so that, as a whole, a portion of the sensor module 400 is inserted into the other side of the sample receiving block 210.

Specifically, the image detecting portion 203 may include a first detection groove portion 203-1, a second detection groove portion 203-2, and a third detection groove portion 203-3.

The first detection groove portion 203-1 is formed in a groove shape on the other side of the block body 211 so that a part of the sensor module 400 can be inserted thereinto, and the second detection groove 203-2 may be formed on the other side of the first block 212 to surround a lower side of a portion of the sensor module 400, and the third detection groove portion 203-3 may be formed on the other side of the second block 213 corresponding to the second detection groove portion 203-2 and surround an upper side of a portion of the sensor module 400.

That is, when the first block 212 and the second block 213 are coupled, the second detection groove portion 203-2 and the third detection groove portion 203-2 respectively formed on the other sides of the first block 212 and the second block 213 may be coupled to face each other and form a sensor module through-hole, and a portion of the sensor module 400 may be inserted into the first detection groove portion 203-1, passing through the sensor module through-hole.

Figure 9:
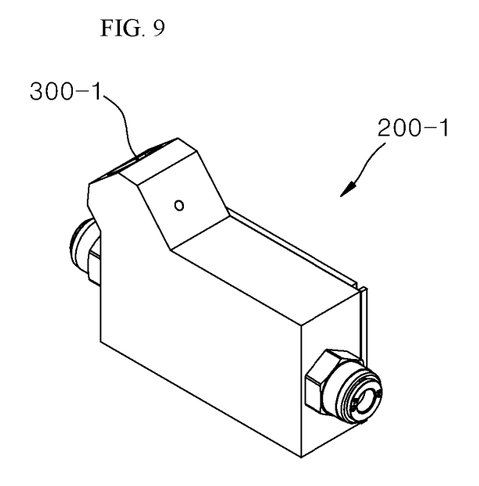
FIG. 9 is a perspective view of a sample receiving module according to another embodiment of the present invention.

In addition, as shown in FIG. 9, a sample receiving module 200-1 according to another embodiment of the present invention may be included.

Figure 10:
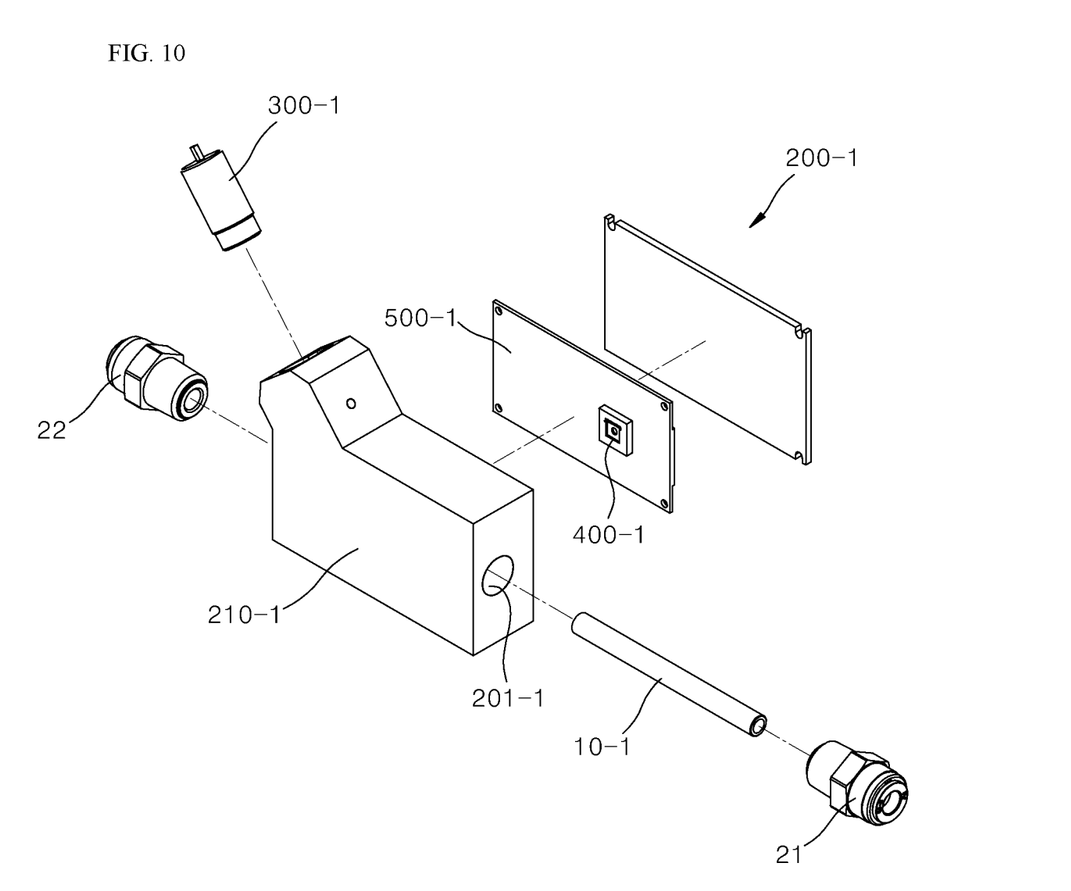
FIG. 10 is an exploded perspective view of the sample receiving module of FIG. 9.
Figure 11:
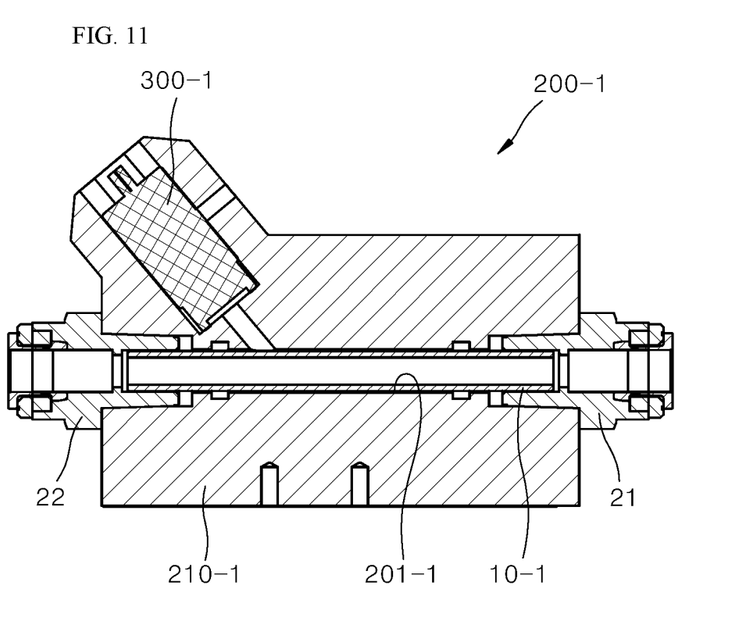
FIG. 11 is a cross-sectional view showing a cross section of the sample receiving module of FIG. 9.

FIG. 9 is a perspective view of the sample receiving module 200-1 according to another embodiment of the present invention, FIG. 10 is an exploded perspective view of the sample receiving module 200-1, and FIG. 11 is a cross-sectional view showing a cross section of the sample receiving module 200-1.

As shown in FIGS. 9 to 11, the sample receiving module 200-1 may include a sample receiving block 210-1, a sample receiving block cover, a first joint portion 21, and a second joint portion 22.

The sample receiving block 210-1 may have a groove portion formed on one side thereof to accommodate a light emission module 300-1, a sensor module 400-1 may be formed on the other side of the sample receiving block 210-1, and a sample groove portion 201-1 may be formed to accommodate therein a container 10-1.

The sample groove portion 201-1 may be in a hollow shape with openings at opposite sides, and a tubular container 10-1 may be inserted therein and fixed to the sample receiving block 210-1 by means of the first joint portion 21 and the second joint portion 22 at each side of the inserted container 10-1.

At this time, the container 10-1 is in a hollow tube shape with openings at opposite sides and the sample can flow inside the container 10-1. The flow of the sample is stopped by valves (not shown) formed on each side of the container 10-1 so that the sample can be accommodated in the container 10-1.

A pattern may be formed on the sample groove portion 201 of the sample receiving block 210 by performing surface treatment on the sample groove portion 201 to remove unevenness of a surface so that the light scattered by the sample accommodated in the sample groove portion 201 is uniformly reflected on the surface of the sample groove portion 201.

Surface treatment may be performed on the sample groove portion 201-1 to remove unevenness of a surface so that the light scattered by the sample accommodated in the sample groove portion 201-1 is uniformly reflected on the surface of the sample groove portion 201-1, and thereby a pattern may be formed on the surface of the sample groove portion 201-1.

In this case, as described above, the surface of the sample groove portion 201-1 may be anodized in order to achieve a uniform surface of the sample groove portion 201-1 by adding an arbitrary pattern to the sample groove portion 201-1.

In addition, the sample receiving block 210-1 may be formed of aluminum having excellent thermal conductivity and relatively high light reflectivity.

The light emission module 300-1 emits light in an inclined direction from one side of the container 10-1 to generate a speckle due to reflection and scattering in the container 10-1, and the sensor module 400-1 provided on the other side of the container 10-1 may detect the speckle.

Figure 4:
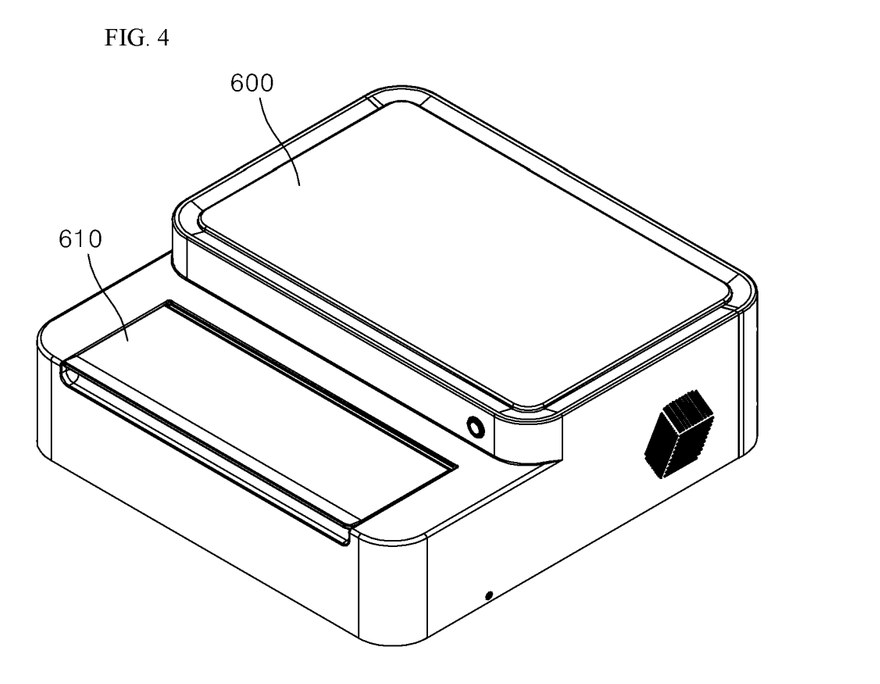
FIG. 4 is a perspective view of a microbial detection apparatus according to an embodiment of the present invention.
Figure 5:
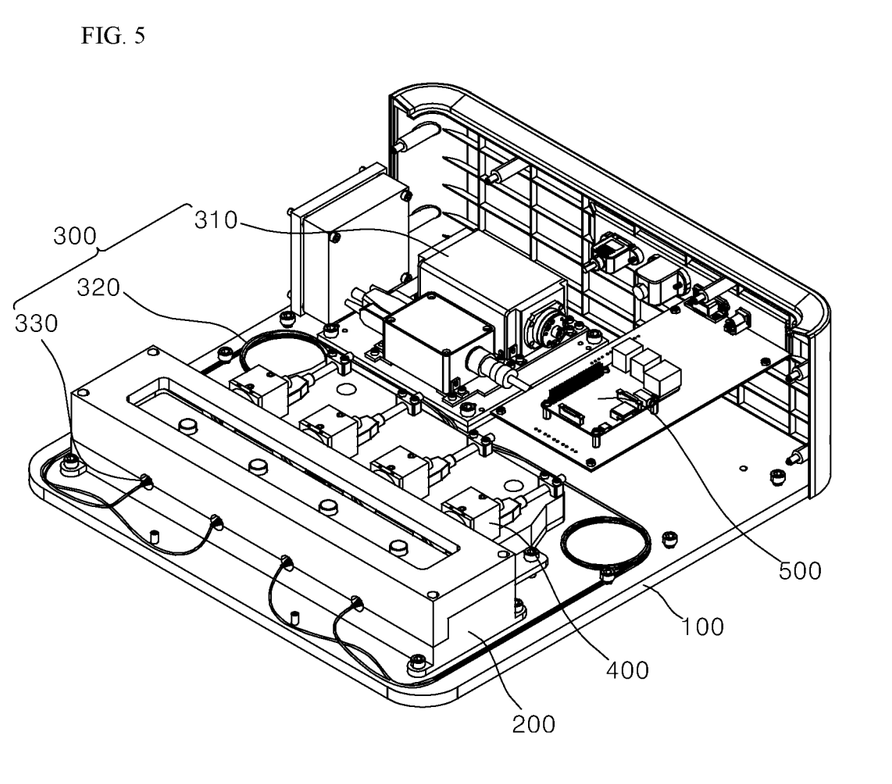
FIG. 5 is a perspective view showing an interior of a microbial detection apparatus according to an embodiment of the present invention.
Figure 6:
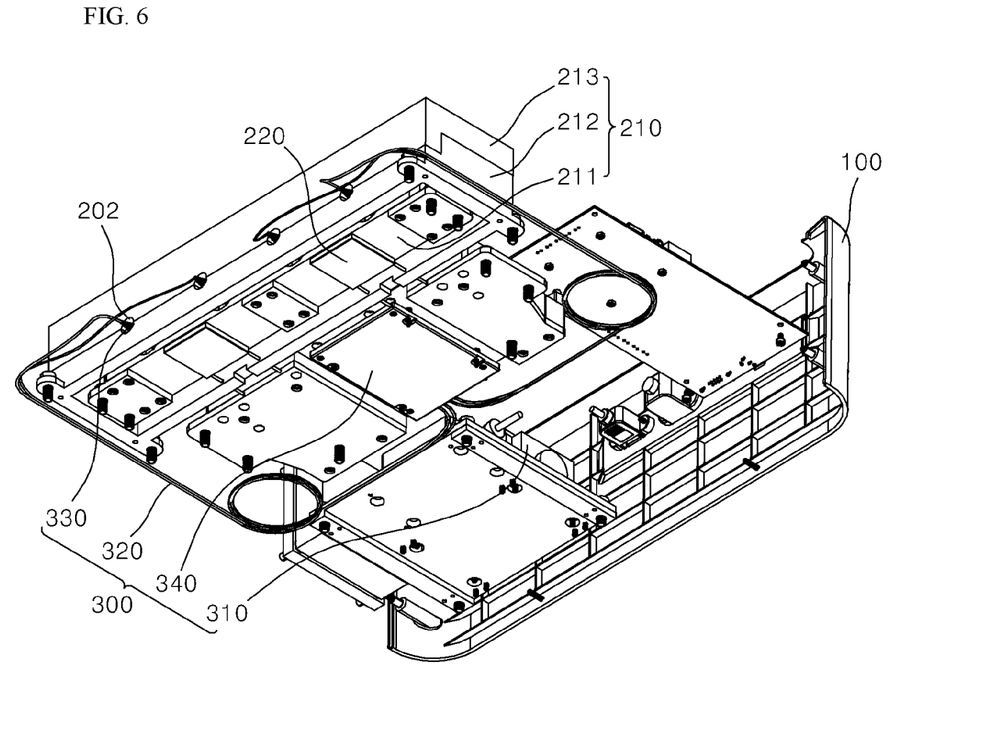
FIG. 6 is a bottom perspective view showing a lower portion of a microbial detection apparatus according to an embodiment of the present invention.

FIG. 4 is a perspective view of a microbial detection apparatus according to an embodiment of the present invention, FIG. 5 is a perspective view showing an interior of a microbial detection apparatus of FIG. 4, and FIG. 6 is a bottom perspective view showing a lower portion of a microbial detection apparatus of FIG. 4.

As shown in FIGS. 4 and 6, the microbial detection apparatus according to an embodiment of the present invention may largely include a body 100, a sample receiving module 200, a light emission module 300, a sensor module 400, a controller 500, and a case 600.

The body 100 may be a structure with a support space formed at an upper portion thereof, which has sufficient strength and durability to support the sample receiving module 200, the light emission module 300, the sensor module 400, and the controller 500.

As shown in FIGS. 5 and 6, the sample receiving module 200 may be formed in the body 100 and include a sample receiving block 210 that can accommodate a sample therein.

The sample receiving block 210 may include a block body 211, a first block 212, a second block 213, a sample groove portion 201, an emission device receiving portion 202, and an image detecting portion 203.

As shown in FIG. 6, the sample receiving module 200 may include a heating device 220.

The heating device 220 may supply heat to bacteria or microbes in the sample at a preset temperature. For example, the heating device 220 may minimize noise, such as vibration, by using a Peltier device or resistive heating.

Specifically, the apparatus for detecting microbes according to the present invention emits light to the sample and detects a speckle generated by bacteria or microbes contained in the sample by using the sensor module 400, and as a method of measuring the growth or reduction of the bacteria or microbes contained in the sample, an incubation process is required to culture bacteria.

In this case, since the speckle detected by the sensor module 400 is sensitive to the flow of bacteria or microbes contained in the sample, the flow must be constant, and a speckle imaging technique is an extremely sensitive technique, which may recognize vibration generated in surrounding environment as a noise source. Therefore, a Peltier element or resistive heating may be applied as a vibration-free heating means.

In addition, as shown in FIG. 3, the sample receiving module 200 may further include a ball plunger 230.

The ball plunger 230 may be formed to be inserted into the sample receiving block 210 so that it presses at least a portion of the container 10, when the container 10 is inserted into the sample receiving block 210, and thus the container 10 can be fixed to the sample receiving block 210.

For example, the ball plunger 230 is a mechanical component that includes a spring, and may be formed so that the container 10 can be fixed to the sample groove portion 201.

When the container 10 is shaken, vibration may cause bacteria or microbes contained in the sample to vibrate, which results in occurrence of noise, and noise may be included in the detected speckle. When such noise acts as a signal, it may have a significant impact on an analysis of a sensitive speckle image. Thus, when the container 10 is fixed to the sample groove portion 201 by using the ball plunger 230, noise may be prevented from being generated.

At this time, the container 10 may be formed overall in the shape of a column having an opening formed on an upper side and a bottom surface formed on a lower side, and a light-incident portion 11 that corresponds to the light emission module 300 and a light exit portion 12 that corresponds to the sensor module 400 may be formed such that they are not aligned with each other, so that the speckle generated by the light emission module 300 and detected by the sensor module 400 can be amplified.

For example, the container 10 may be formed of a transparent material through which light can be transmitted, and thus the light emitted from the light emission module 300 may be incident into the container 10 and the light scattered by the sample in the container 10 may be emitted again to the sensor module 40.

Specifically, a point on one lateral side of the container 10 into which the light is emitted by the light emission module 300 may be the light-incident portion 11 and a point on the other lateral side of the container 10 through which the light exits from the sensor module 400 to the outside of the container 10 may be the light exit portion 12. In this case, the light-incident portion 11 and the light exit portion 12 are formed not to be aligned with each other, so that scattered light that is generated by bacteria or microbes contained in the sample when the light emitted by the light emission module 300 is incident to the light-incident portion 11 and multiple-scattered in the container 10 can be amplified.

Figure 7:
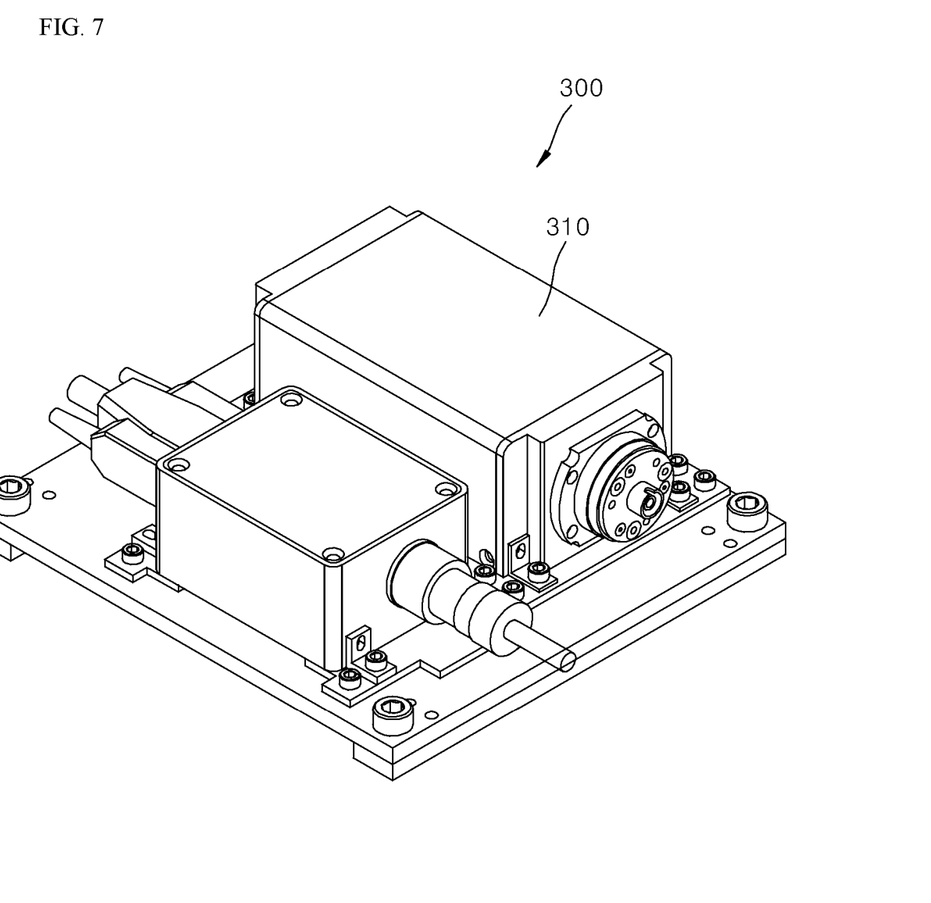
FIG. 7 is a perspective view of a light emission module of the microbial detection apparatus of FIG. 5.

FIG. 7 is a perspective view of the light emission module 300 of the microbial detection apparatus of FIG. 5.

As shown in FIGS. 5 and 7, the light emission module 300 is a configuration for emitting light to the sample, and may include the light source portion 310, the light transmission medium 320, the light exit portion 330, and the light source splitting device 340.

The light emission module 300 may emit the light to the sample 10. In this case, the sample may contain bacteria or microbes and thus may have a non-uniform internal reflective index.

When light launched from the light emission module 300 is emitted to the sample, highly complex multiple scattering may occur inside the sample by the bacteria or microbes contained in the sample. Waves scattered in complicated paths through the multiple scattering may cause constructive interference or destructive interference, and the constructive or destructive interference of the waves generates a grainy pattern, that is, a speckle.

The light source portion 310, which is a device to generate light, may be supported on the upper portion of the body 100 and generate the light to be emitted to the sample. In order to form a speckle by emitting the light to the sample, laser light having a constant wavelength and excellent coherence may be used. In this case, measurement accuracy may increase as a spectral bandwidth of a wave that determines the coherence of the light decreases.

The light transmission medium 320 is a device that transmits light generated from the light source portion 310, and for example, the light transmission medium 320 may be an optical fiber.

The light exit portion 330 is provided to emit the light transmitted from the light transmission medium 320 to the sample. The light exit portion 320 may be formed at an end of the light emission module 300 and inserted into one side of the sample receiving module 200, and emit the light from one side of the sample toward the sample.

The light source splitting device 340 may split the light generated by the monolithically formed light source portion 310 into the light exit portion 330 provided in plural.

For example, a plurality of sample grooves 201 are formed in the sample receiving module 200 to accommodate a plurality of containers 10 containing the sample, and a plurality of light exit portions 330 may be formed to emit the light to the plurality of containers 10 accommodated in the plurality of sample grooves 201.

Specifically, the light source splitting device 340 is fixed to the upper portion of the body 100 and may emit light generated from one light source potion 310 to the plurality of light exit portions 330 through a plurality of light transmission media 320.

At this time, each light generated from the plurality of light exit portions 330 is emitted to each container 10 at the same wavelength, so that the bacteria or microbes contained in the sample are scattered by the light of the same wavelength. Accordingly, the samples contained in each container 10 may be more accurately compared.

Figure 8:
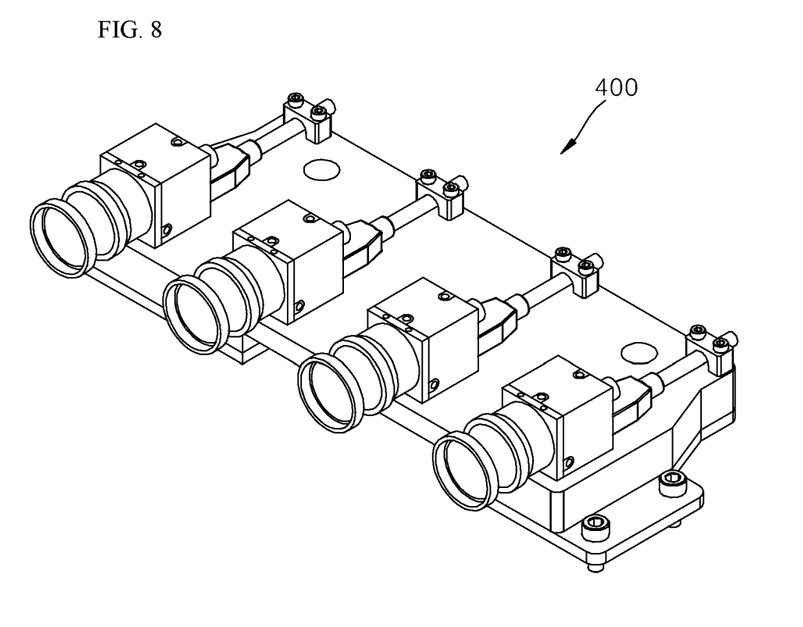
FIG. 8 is a perspective view of a sensor module of the microbial detection apparatus of FIG. 5.

FIG. 8 is a perspective view of the sensor module 400 of the microbial detection apparatus of FIG. 4.

As shown in FIGS. 5 and 8, the sensor module 400 may detect a speckle generated when the light emitted to the sample is scattered by the movement of bacteria or microbes contained in the sample.

The sensor module 400 may be inserted into the other side of the sample receiving block 210 and detect a scattering light image of light scattered by the sample from the other side of the sample in the direction of the sample. For example, the sensor module 400 may include a light-receiving portion or a condensing lens to receive the scattered light.

The sensor module 400 may detect microscopic fluctuations in the speckle to sense motion of the bacteria or microbes contained in the sample.

The sensor module 400 may detect a laser speckle that is generated when the emitted light is multiple-scattered by the sample, every preset time point or every arbitrary time interval.

The sensor module 400 may include a sensing means corresponding to the type of light. is For example, when a light source in the visible wavelength range is used, a charge-coupled device (CCD) camera, which is a photographing device, may be used.

The sensor module 400 may be preferably a camera capable of measuring two-dimensional information, and a camera that measures one-dimensional information may also be used. Further, the camera may further include an optical system, such as a micro lens, between the sample and the camera so as to minimize an autofocusing effect of the camera and overcome an optical distance to measure the speckle.

In order to detect the speckle, the sample groove portion 201 and the sensor module 400 may be formed in various ways.

For example, the light is emitted to one sample groove portion 201 so that a speckle is detected in a single sensor module 400, and a plurality of sensor modules 400 may be provided at a plurality of points in one sample groove portion 201 and detect speckles at a number of points.

In addition, a plurality of sample groove portions 201 may be formed and a different antibiotic may be injected to each of the sample groove portions 201. Alternatively, a different amount of the same antibiotics may be injected to each of the sample groove portions 201 and the speckle scattered from the sample in each sample groove portion 201 may be detected.

The controller 500 may control the light emitted by the light emission module 300, and may store and analyze the images detected by the sensor module 400.

Although not shown, the controller 500 may include a light emission controller, an imaging collector, an obtainer, a corrector, and an estimator.

The light emission controller may be connected to the light emission module 300 and control an emission period and an emission intensity of light emitted by the light emission module 300. The imaging collector may be connected to the sensor module 400 and store speckle images is generated through multiple scattering by the bacteria or microbes contained in the sample. The obtainer may obtain a temporal correlation of the speckles by using the detected speckles. The corrector may correct a deviation caused by a difference in the amount of light when the light emission module 300 emits the light. The estimator may estimate, in real-time, the presence or absence of bacteria or microbes in the sample or a concentration of the bacteria or microbes.

Specifically, the controller 500 may obtain the temporal correlation of the speckles by using the detected speckles and estimate, in real-time, the presence or absence of virus in the sample or a concentration of the virus on the basis of the temporal correlation.

That is, the controller 500 may detect an optical path that slightly changes over time due to microscopic biological activities (e.g., intracellular movement, movement of microbes, etc.) by using the sensor module 400, and analyze a speckle pattern that changes due to the fine change in the optical path.

In this way, by measuring the temporal change in the detected speckle pattern, the biological activities of the microbes may be rapidly measured. As such, in the case where the change over time of the speckle pattern is measured, the multiplication, inhibition, and reduction over time of the microbes may be confirmed by analyzing the presence or absence and the change in concentration of the microbes contained in the sample to which an antibiotic is injected.

For example, the sensor module 400 may detect a first image before injection of the antibiotic, detect a second image after injection of the antibiotic, and transmit the detected images to the imaging collector 520, and the estimator 550 may analyze changes in the transmitted first and second images.

For example, if there is no motion of microbes or bacteria contained in the sample, coherent-light speckles appear with a uniform interference pattern along time. That is, if there is no motion of bacteria or microbes in the sample, a uniform interference pattern of coherent-light speckles are found from coherent-light speckle images taken every reference time. As such, when the coherent-light speckle images show a uniform interference pattern, the controller 500 may determine that microbes or bacteria are reduced and eliminated (no longer exist) in the sample.

On the other hand, when the coherent-light speckle pattern changes, the controller 500 may estimate that bacteria and microbes remain in the sample. That is, in the case where bacteria or microbes are present in the sample, such changes may be estimated as due to multiplication and continuous motion of the bacteria and microbes along time. This motion of the bacteria and microbes may cause a continuous change of the laser speckle pattern along time, and accordingly, when the coherent-light speckle pattern is changed to a degree greater than or equal to a predetermined error range in the coherent-light speckle images measured every reference time, the controller 500 may determine that bacteria and microbes are still present in the sample.

Further, the controller 500 may control the sensor module 400 to detect speckles at more multiple time points.

As shown in FIG. 4, the case 600 may include a cover 610 that can open and close to cover the sample receiving module 200 so that the sample is not exposed to the external environment when a test is performed by coupling the container 10 to the sample receiving module 200.

The case 600 may be a structure which has an internal accommodating space to accommodate the sample receiving module 200, the light emission module 300, the sensor module 400, and the controller 500 and has sufficient strength and durability to support these components.

In addition, as described above, the sample receiving module 200-1 may include the sample receiving block 210-1, a sample receiving block cover, the first joint portion 21, and the second joint portion 22, and the light emission module 300-1 emits light in an inclined direction from one side of the container 10-1 to generate a speckle due to reflection and scattering in the container 10-1, and the sensor module 400-1 provided on the other side of the container 10-1 may detect the speckle.

As shown in FIG. 5, the controller 500 may be formed inside the body 100, and, as shown in FIG. 10, a receiving portion that can accommodate the controller 500-1 may be formed on at least one side of the sample receiving block 210-1, whereby the controller 500-1 may be formed inside the sample receiving block 210-1. Here, the role of the controller 500-1 is the same as described above.

As described above, the test sample receiving block and the microbial detection apparatus using the same according to the present invention use laser speckles to perform an antibiotic susceptibility test on a sample containing bacteria or microbes. Since the test sample receiving block is made of an aluminum material, it has excellent thermal conductivity, which allows easy transfer of heat for incubation, and it is optically beneficial because of high light reflectivity. Also, by performing surface treatment on the sample groove portion to remove the unevenness of the surface, it is possible to quickly and accurately detect whether or not bacteria or microbes exist and multiply in the sample, with minimum measurement deviation.

According to the test sample receiving block and the microbial detection apparatus using the same in accordance with an embodiment of the present invention as described above, unevenness, such as scratches or tool paths, generated during metal processing is removed, thereby minimizing measured deviation between wells. Accordingly, speckles can be formed uniformly in each well, and as aluminum is used, it is possible to realize the test sample receiving block and the microbial detection apparatus using the same which are optically beneficial and can easily transfer heat for incubation. However, the scope of the present invention is not limited by these effects.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A microbial detection apparatus comprising:
a body;
a sample receiver formed in the body and comprising a sample receiving block that accommodates a sample;
a light emitter configured to emit light to the sample;
a sensor module configured to detect a speckle generated when the light emitted to the sample is scattered by motion of bacteria or microbes contained in the sample; and
a controller configured to control the light emitted to the sample by the light emitter and store and analyze images detected by the sensor module,
wherein the sample receiving block is surface-treated to remove unevenness of a surface of the sample groove portion and form a pattern on the surface of the sample groove portion so that the light scattered by the sample accommodated in the sample groove portion is uniformly reflected on the surface of the sample groove portion,
wherein the sample receiving block comprises a light emitter receiving portion which is formed on one side of the sample receiving block to accommodate at least a portion of the light emitter and comprising a light emitter groove portion that communicates with the sample groove portion; and
an image detecting portion which is formed on the other side of the sample receiving block so that an image scattered by the sample is detected by the sensor module and comprising
a detection groove portion that communicates with the sample groove portion
wherein the sample groove portion accommodates a container in which the sample is contained and the container is formed overall in the shape of a column having an opening formed on an upper side and a bottom surface formed on a lower side, wherein a light-incident portion that corresponds to the light emitter and a light exit portion that corresponds to the sensor module are formed such that they are not aligned with each other, so that the speckle generated by the light emission module and detected by the sensor module can be amplified.

2. The microbial detection apparatus of claim 1, wherein the sample groove portion formed in the sample receiver is provided in plural.

3. The microbial detection apparatus of claim 1, wherein the sample receiver further comprises a ball plunger which is formed to be inserted into the sample receiving block so that it presses at least a portion of a container containing the sample to allow the container to be fixed to the sample receiving block when the container is inserted into the sample receiving block.

4. The microbial detection apparatus of claim 1, further comprising a case provided with a cover that can open and close to cover the sample receiver so that the sample is not exposed to an external environment when a test is performed by coupling a container that contains the sample to the sample receiver.

5. The microbial detection apparatus of claim 1, wherein the controller is configured to obtain a temporal correlation of the speckle by using the detected speckle and estimate, in real-time, presence or absence of virus in the sample or a concentration of the virus on the basis of the temporal correlation.

* * * * *